(12) United States Patent
Sheasby et al.

(10) Patent No.: US 6,466,214 B1
(45) Date of Patent: Oct. 15, 2002

(54) MARKING PARAMETERS FOR ANIMATION (75) Inventors: Michael C. Sheasby, Boucherville (CA); Sylvain Moreau, Montreal (CA); Daniel Desbois, Boucherville (CA); Jean-Claude Bouchard, Sainte-Adele (CA)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/369,822

(22) Filed: Aug. 6, 1999

(51) Int. Cl.[7] .............................................. G06T 15/00
(52) U.S. Cl. ...................................................... 345/473
(58) Field of Search ............................... 345/419, 420, 345/421, 422, 473, 474, 475

(56) References Cited

FOREIGN PATENT DOCUMENTS

EP       0 917 107 A    10/1998

OTHER PUBLICATIONS

Hodgins, J.K. et al: "Adapting Simulated Behaviors For New Character", Computer Graphics Proceedings, SIGGRAPH, Aug. 3, 1997, pp. 153–162.

Laszio, J. et al: "Limit Cycle Control And Its Application To The Animation Of Balancing And Walking", Computer Graphics Proceedings, SIGGRAPH, Aug. 4, 1996, pp. 155–162.

U.S. patent application Ser. No. 09/369,516, Sheasby et al., filed Aug. 6, 1999.

U.S. patent application Ser. No. 09/369,615, Mathur et al., filed Aug. 6, 1999.

U.S. patent application Ser. No. 09/369,688, Nadas et al., filed Aug. 6, 1999.

U.S. patent application Ser. No. 09/369,689, Sheasby et al., filed Aug. 6, 1999.

*Primary Examiner*—Phu K. Nguyen
(74) *Attorney, Agent, or Firm*—Peter J. Gordon, Esq.

(57) ABSTRACT

The present invention advantageously provides for a method and system that is operable on a computer system, for selectively determining parameters values or keys to be made available to graphical imaging system to drive a animation application. The method includes receiving a Parameter Set (PSet) having a plurality of parameters corresponding to the animation application, assigning one or more of said parameters a value; marking a subset of said parameters, modifying the keys of only marked parameters according to the parameter's value, and running the animation application in response to the keys after marking.

18 Claims, 12 Drawing Sheets

MARKING PARAMETERS FOR ANIMATION

FIELD OF THE INVENTION

The present invention relates particularly to a graphics imaging system for producing animation and more particularly to a graphics imaging system that enables the application of animation keys to only a subset of a large number of animation parameters at a time.

BACKGROUND OF THE INVENTION

Computer systems for generating animation are used in the cinema and television industries. In these industries, animation is useful for generating entertainment multimedia and programs for professional purposes such as training materials. These applications are used by an animator to produce the finished imaging work, which typically involves controlling specific objects through a sequence of scenes or settings to present a movement in the object during the time span.

The objects that are controlled by the animators are represented in the memory of the computer system through a data construct termed a "PSet", which contains parameter values or pointers to parameter values for properties associated with the object. A PSet is hierarchical in structure, and thus can contain other lower level PSets within it. For example, an object such as a "style" that defines the attributes of a brush stroke applied to a surface in a graphics session can be defined as a top-level PSet that includes lower level PSets such a "brush" and "fill effect" within it. These lower level PSets in this hierarchical structure are considered the children of the top level PSet, style. Whenever the top-level PSet "style" is referred to, a reference to the lower-level PSets, "brush" and "fill effect" is implicit. PSets can be generated as basic units that correspond to a specific object, and more complex PSets can thus be generated from these basic PSets.

Because PSets can be constructed from other PSets, it is typical for a basic PSet that implements a fundamental function such as a "brush" object to be used in a number of other PSets, and thus the parameter values of the PSet to be used in describing more than one object at a time. The parameter values referenced by a PSet includes a construct termed a "key", which defines a mapping between a certain point in time and the value of a parameter which can vary over time. Typically, keys are used by the animator to generate a mathematical curve that in some way represents the motion associated with the animation. These curves can be displayed visually using a viewer, which plots the value of the parameter with respect to time.

In the process of producing the animation, an animator may experiment with different key settings to generate different animation results. The parameter values and the keys may be set by a variety of ways, including invoking a specific PSet editor, a scene editor, or by setting them directly in the animation editor, using external physical devices. Because of the typically large list of parameters associated with a PSet, it can be difficult for an animator to determine the actual key settings that are being used in the animation.

It is advantageous to provide global animation controls which allow the user to set keys on multiple parameters simultaneously, as this allows him to configure the output of the system in a desired state and then bind the current settings to the current time as a single action. The alternative, having the user set a key for each parameter in the system manually, would be time-consuming and repetitive.

Moreover, while many attributes of an object may be animatable, it is often desirable for only a subset of these attributes to receive animation keys when the user chooses to apply this global key. The user may be focussing his attention on a specific set of parameters for animation and have inadvertently set values on other parameters which he would prefer not to be stored as keys.

Therefore it is desirable to have a mechanism to mark only certain keys within a PSet of updated values, and set keys only on these marked parameters when the user issues a command to globally set keys at the current time.

SUMMARY OF THE INVENTION

The present invention advantageously provides for a method and system that is operable on a computer system, for selectively determining keys to be made available to a graphical imaging system to drive a animation application. The method includes receiving a Parameter Set (PSet) having a plurality of parameters corresponding to the animation application, assigning one or more of said parameters a value; marking a subset of said parameters, modifying the keys of only marked parameters according to the parameter's value, and running the animation application in response to the keys after marking.

In one aspect of the invention, when the user issues "set a key", the system binds values to time only on those parameters that have been marked for animation.

In a further aspect of the invention, the simulation application is an animation application for producing an animated presentation. The PSets therefor represent specific objects, such as a brush or painting device, associated with the animation.

In a still further aspect of the invention, the PSet data structure includes keys for defining temporal characteristics of the animation in the form of a mathematical graph. The parameter values can be selectively marked to determine which parameter values will receive a key for animation.

In a yet further aspect of the invention, an animation application having a large number of parameter values associated with the animation can be controlled by marking those parameters, having modified values, for which the animation is to occur.

BRIEF DESCRIPTION OF THE DRAWINGS

A specific embodiment of the invention will now be described, by way of example, with reference to the accompanying drawings in which.

DETAILED DESCRIPTION

In the following discussion, the present invention is described for illustrative purposes with reference to the editing of video information or animation. However, one of ordinary skill in the art will recognize that the invention, in it broadest aspect, is applicable to applications other than video applications, and it is not intended that the scope of the invention be so limited. For example, the present invention is also applicable to a simulation engine that uses a subset of a plurality of parameters to drive a simulation.

Figure 1:
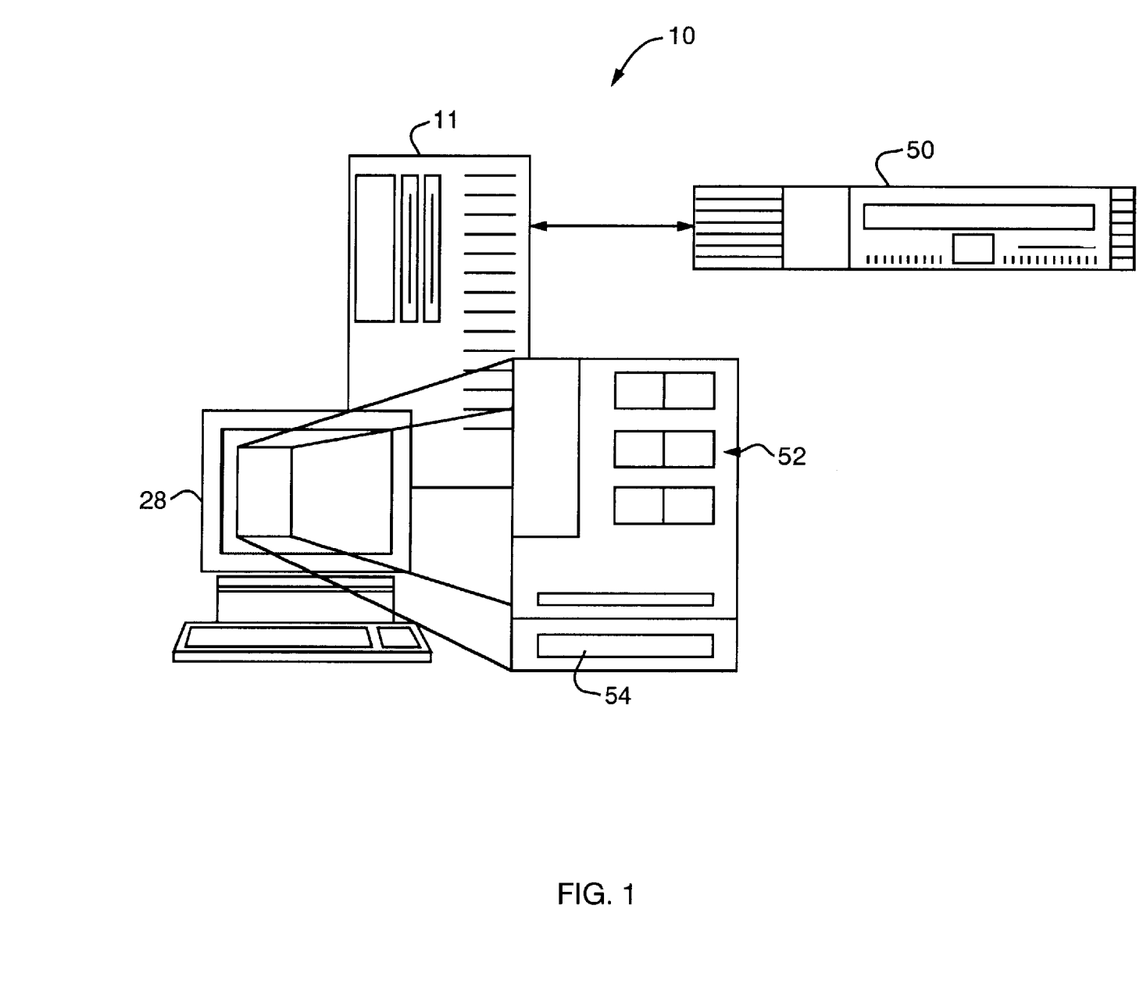
FIG. 1 is a drawing of a computer system suitable for implementing a system for editing PSets, according to the present invention.
Figure 2:
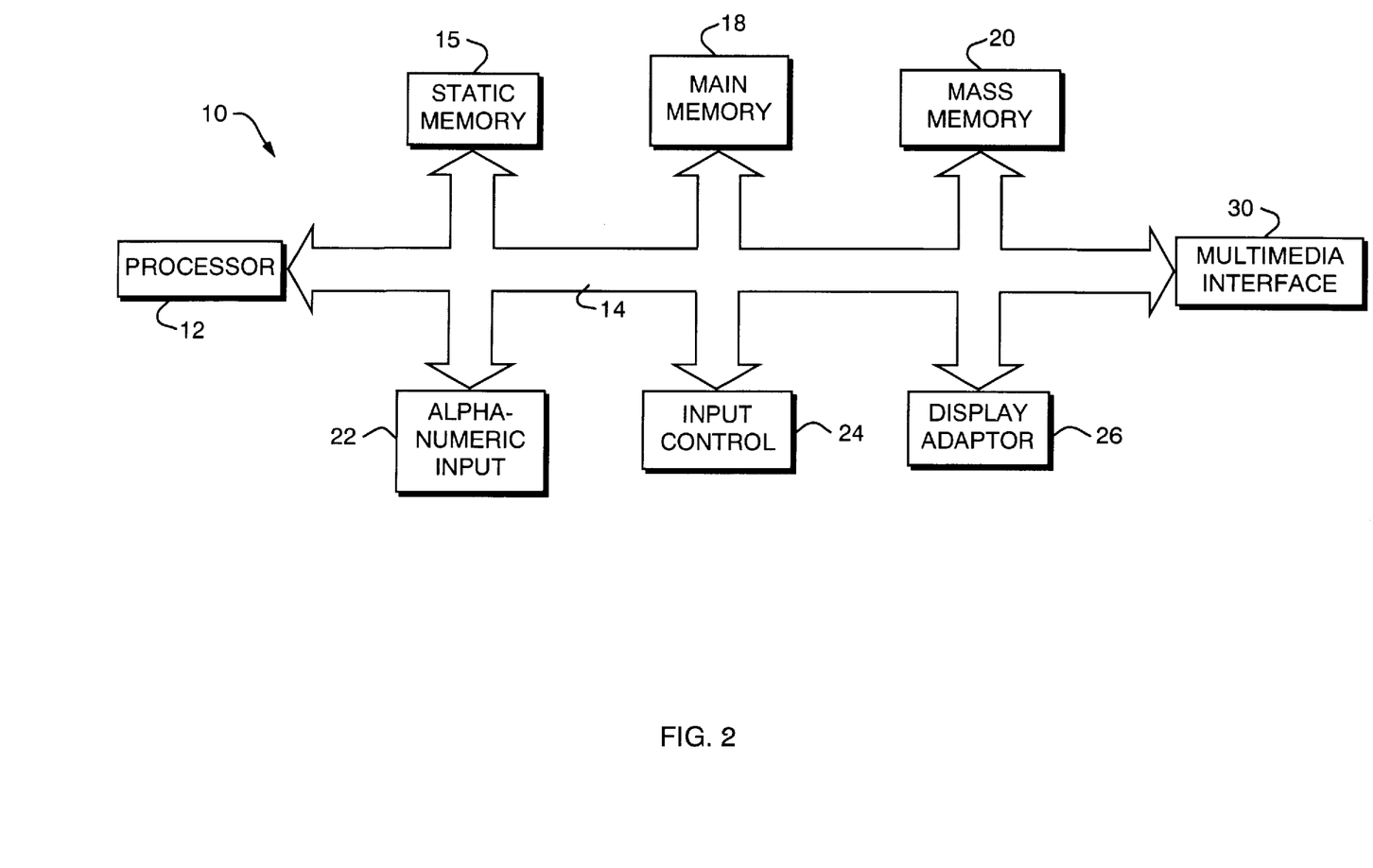
FIG. 2 depicts the hardware components of the computer system of FIG. 1 in further detail.

A computer graphics imaging system 10 is schematically depicted in FIG. 1 and FIG. 2. The graphics imaging system 10 includes a computer 11 that has a central processing unit (CPU) 12, a system bus 14, a static memory 16, a main memory 18, a mass memory 20, an alphanumeric input device 22, a pointer device 24 for manipulating a cursor and making selections of data, and a display adapter 26 for coupling control signals to a video display 28 such as a computer monitor. Since the graphics imaging system 10 is particularly suited to high resolution, high-speed graphics imaging the display or monitor 28 is most preferably a high resolution wide screen display.

The CPU 12 executes imaging software described below to allow the system 10 to render high quality graphics images on the monitor 28. The CPU 12 comprises a suitable processing device such as a microprocessor, for example, and may comprise a plurality of suitable processing devices. The CPU 12 executes instructions stored in the static memory 16, main memory 18, and/or mass memory 20.

The static memory 16 may comprise read only memory (ROM) or any other suitable memory device. The static memory may store, for example, a boot program for execution by CPU 12 to initialize the graphics imaging system 10. The main memory 18 may comprise random access memory (RAM) or any other suitable memory device. The mass memory 20 may include a hard disk device, a floppy disk, an optical disk, a flash memory device, a CDROM, a file server device or any other suitable memory device. For this detailed description, the term memory comprises a single memory device and any combination of suitable devices for the storage of data and instructions.

The system bus 14 provides for the transfer of digital information between the hardware devices of the graphics imaging system 10. The CPU 12 also receives data over the system bus 14 that is input by a user through alphanumeric input device 22 and/or the pointer device 24. The alphanumeric input device 22 may comprise a keyboard, for example, that comprises alphanumeric keys. The alphanumeric input device 22 may comprise other suitable keys such as function keys for example. The pointer device 24 may comprise a mouse, track-ball, and/or joystick, for example, for controlling the movement of a cursor displayed on the computer display 28.

The graphics imaging system 10 of FIG. 1 also includes display adapter hardware 26 that may be implemented as a circuit that interfaces with system bus 14 for facilitating rendering of images on the computer display 28. The display adapter hardware 26 may, for example, be implemented with a special graphics processor printed circuit board including dedicated random access memory that helps speed the rendering of high resolution, color images on a viewing screen of the display 28.

The display 28 may comprise a cathode ray tube (CRT) or a liquid crystal display particularly suited for displaying graphics on its viewing screen. The invention can be implemented using high-speed graphics workstations as well as personal computers having one or more high-speed processors.

The graphics imaging system 10 utilizes specialized graphics software particularly suited to take advantage of the imaging hardware included in the display system 10 depicted in FIG. 1 and FIG. 2. The software implements nonlinear editing, compositing, audio mixing, and graphics design suites which are used to create multimedia presentations. Source material for use with such a system can be obtained from a media storage device 50 that can include videotape, film reel, and digitally recorded videodisks. The source material can also be in the form of previously digitized materials stored on a computer memory 20 such as computer generated animations, graphic images or video files stored on a large capacity hard or fixed disk storage device. To utilize the storage images from the media storage 50, the system 10 includes a multi-media interface 30 for converting image data into a form suitable for use by the software executing on CPU 12 and display adapter 26. A representative display by the graphics software presents multiple images 52 of different resolutions.

Marking Parameters

The computer software of the present invention advantageously allows for the marking of parameter within PSets in order to specify which keys of a PSet are modified when the animation is activated. A PSet is an object that includes parameters for driving the animation of the object. These parameters may be time based, and defined by a graph or mathematical curve. The mathematical curve associated with the parameter may be itself defined by keys, which specify points through which the curve will go. Keys are assigned to a parameter curve by issuing a "set key" command. Keys are well known to those of ordinary skill in the art, and are included in commercially available graphics systems such as those distributed by Softimage of Montreal, Canada. Marking parameters to restrict receiving a new key to only marked parameters makes it easier for an animator to focus his attention on one or two parameters.

When at least one parameter is marked, only those parameters that are marked for animation will receive a key when the user issues a command which globally attempts to set keys on all parameters. With no parameters marked, all parameters receive a key when the set key command is issued. Marking of the parameters can be accomplished using an editor or a scene explorer. Marking is ubiquitous; the mark state of parameters is consistent across the entire User Interface (e.g. in property editors and in the scene explorer). Marking a parameter in one place marks all representations of that parameter.

Figure 3:
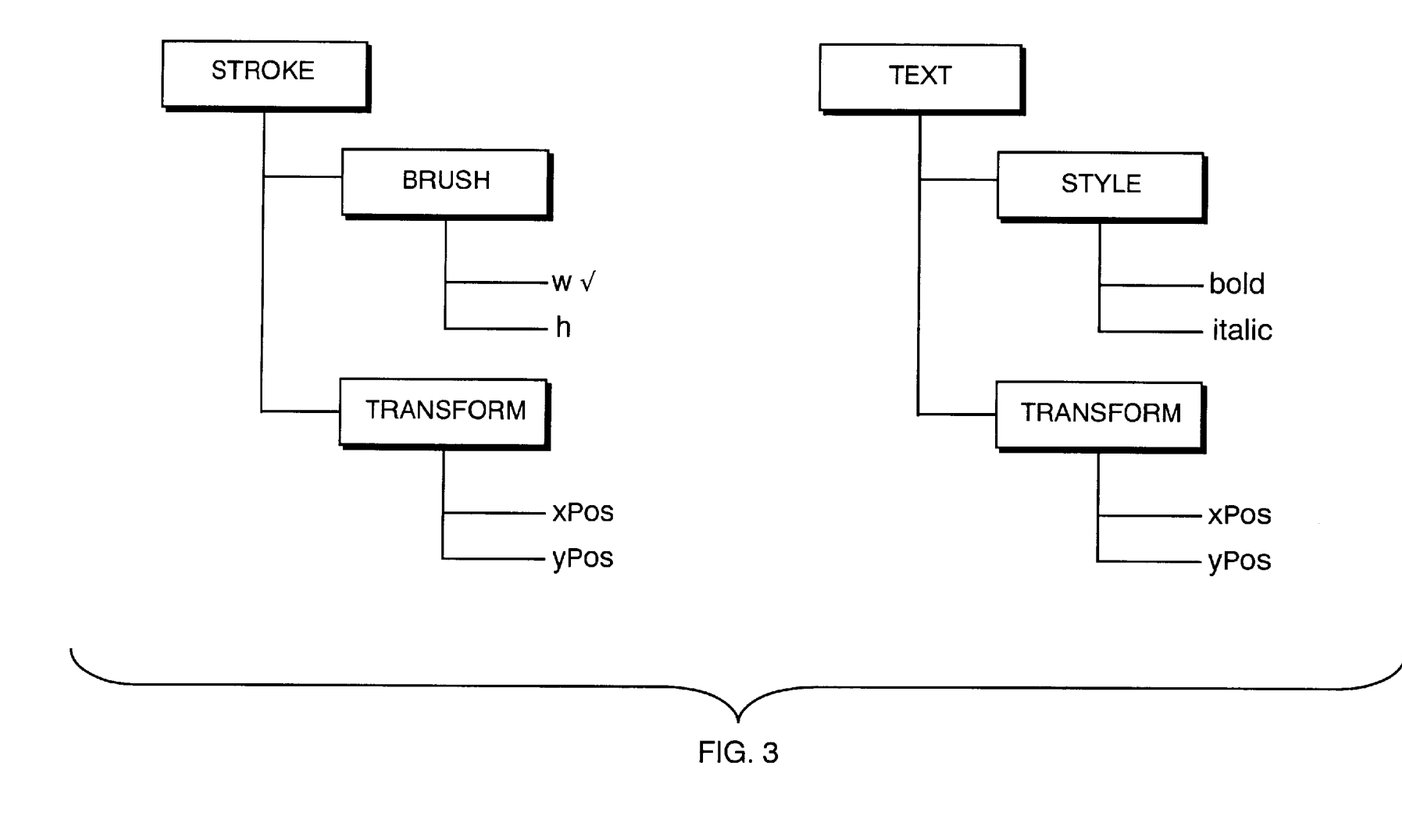
FIG. 3 depicts a hierarchy of PSets for two different objects.

Marking will be further illustrated by the following examples, in which there exist two classes of objects: strokes and text bodies as shown in FIG. 3. Both classes share a "transform" PSet, but have a distinct brush or style PSet. The following conventions are utilized throughout the figures.

(1) PSets are represented as boxes
(2) Individual parameters in represented by Italics
(3) Marked parameters have a check mark beside them.
(4) The current selection is highlighted As shown in FIG. 1, the user has selected the stroke object and marked the 'width' parameter in the brush property page. The user marks a parameter for animation by
    clicking on its label in an editor
    clicking on its label in the scene explorer
    selecting the parameter in the marked parameter transient tree view in the animation toolbox selecting the parameter in the marked parameter transient tree view in the animation toolbox using an interactive manipulator in a viewer, which may or may not mark a parameter, at the discretion of the developer of that manipulator Parameters are not marked during the following operations:

saving a key on a specific parameter (for example, clicking on a control beside that parameter representing the animation state of that particular parameter within a property editor)

touching or modifying the value of that parameter while in 'autokey' (a mode in which any changes to parameters automatically result in keys being applied at the current time and the updated value)

toggling or selecting the curve in the animation editor (a user interface window that reflects the animation curves followed by parameters)

Clicking on the label of a parameter from the pointing device 24 will mark that parameter. However, when the user clicks on the animation divot for a parameter, a key will be set regardless of the marking state of that parameter, and the modifying of a parameter when autokey is active will set a key without marking that parameter.

As was previously discussed, parameters can be marked anywhere that parameters with animation divots are displayed, such as in a scene explorer, a main command panel, a property editor, or an animation editor. A divot is a control appearing beside the representation of a parameter in a property editor which reflects the animation state of that parameter, and which can be used to perform animation tasks on that specific parameter, such as setting or unsetting animation keys. Marking or unmarking a parameter by any of these techniques will be reflected in all other views of the marked parameter. For example, parameters that have been marked in the explorer appear marked in a property editor, and vice versa. For this reason, opening an editor does not result in any changes to marking state for the parameters within the Pset reflected by that editor; All of the controls it contains take their marked/unmarked state from the current marked parameter list. Because marking a parameter is independent from views of that parameter, the marking state of a parameter is maintained across closing and re-opening a view of that parameter. If the user closes and re-opens an editor, the mark state of the parameters it contains remains intact. Furthermore, if the user closes an editor after marking a parameter it contains does not change the fact that that parameter is marked.

Figure 4:
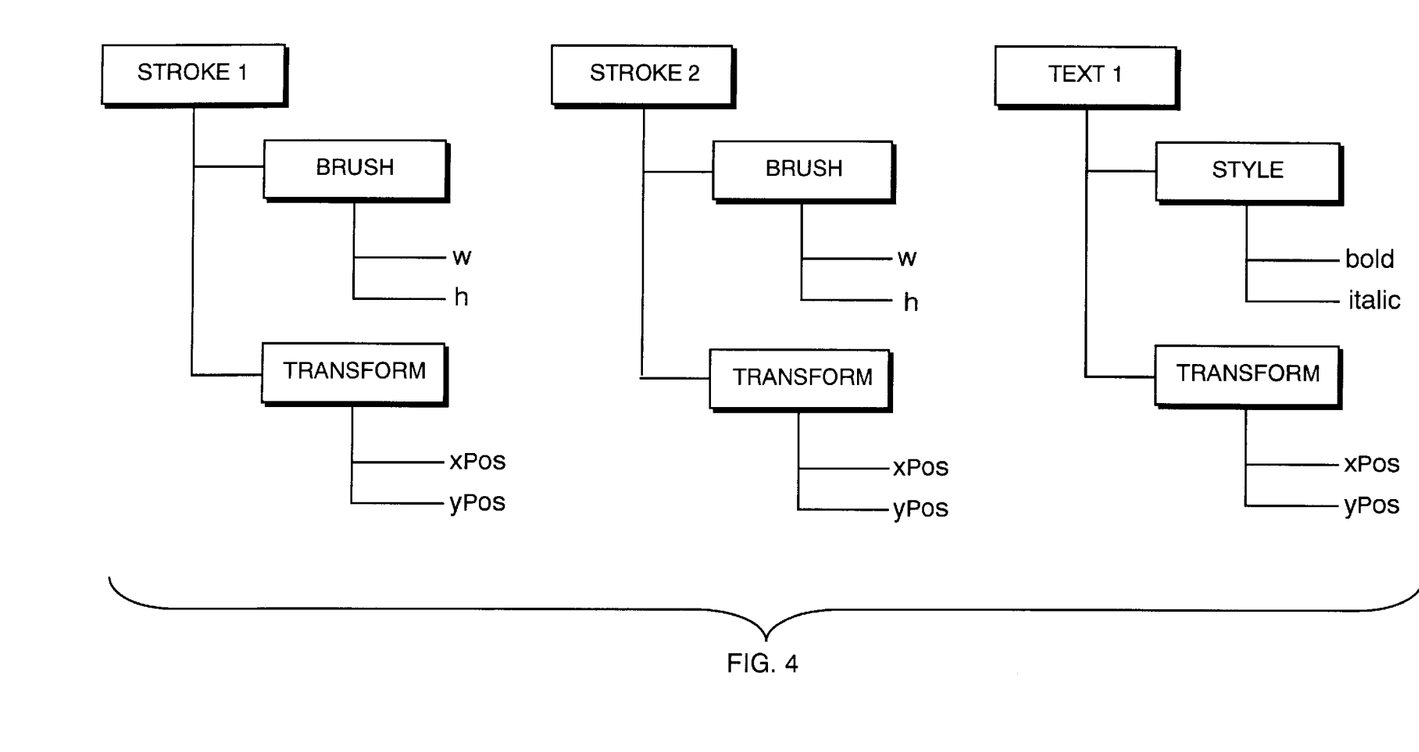
FIG. 4 depicts a second hierarchy of PSets having a common brush PSet defined in two parent PSets.
Figure 5:
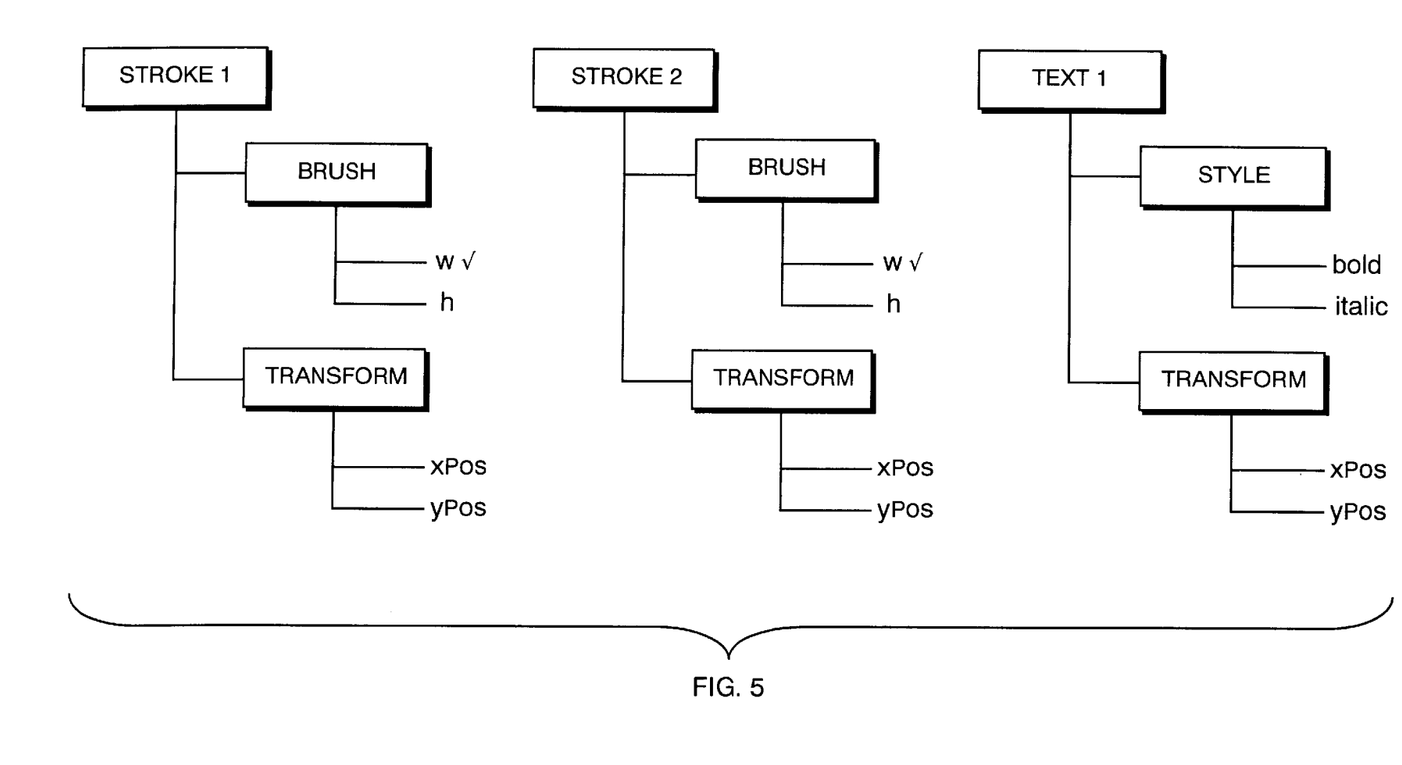
FIG. 5 shows that marking of a parameter for a PSet propagates between PSets.
Figure 6:
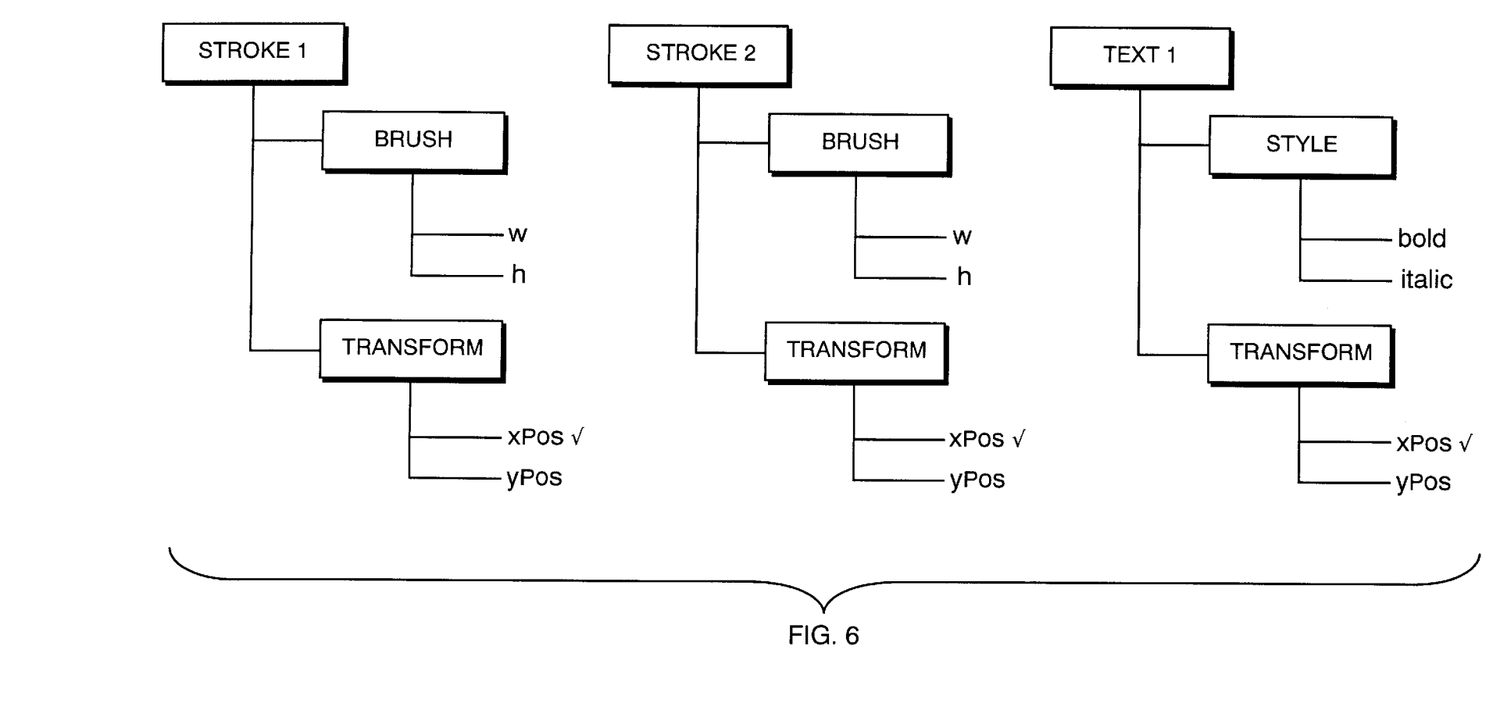
FIG. 6 depicts that marking overrides previous marking selections within a PSet.
Figure 7:
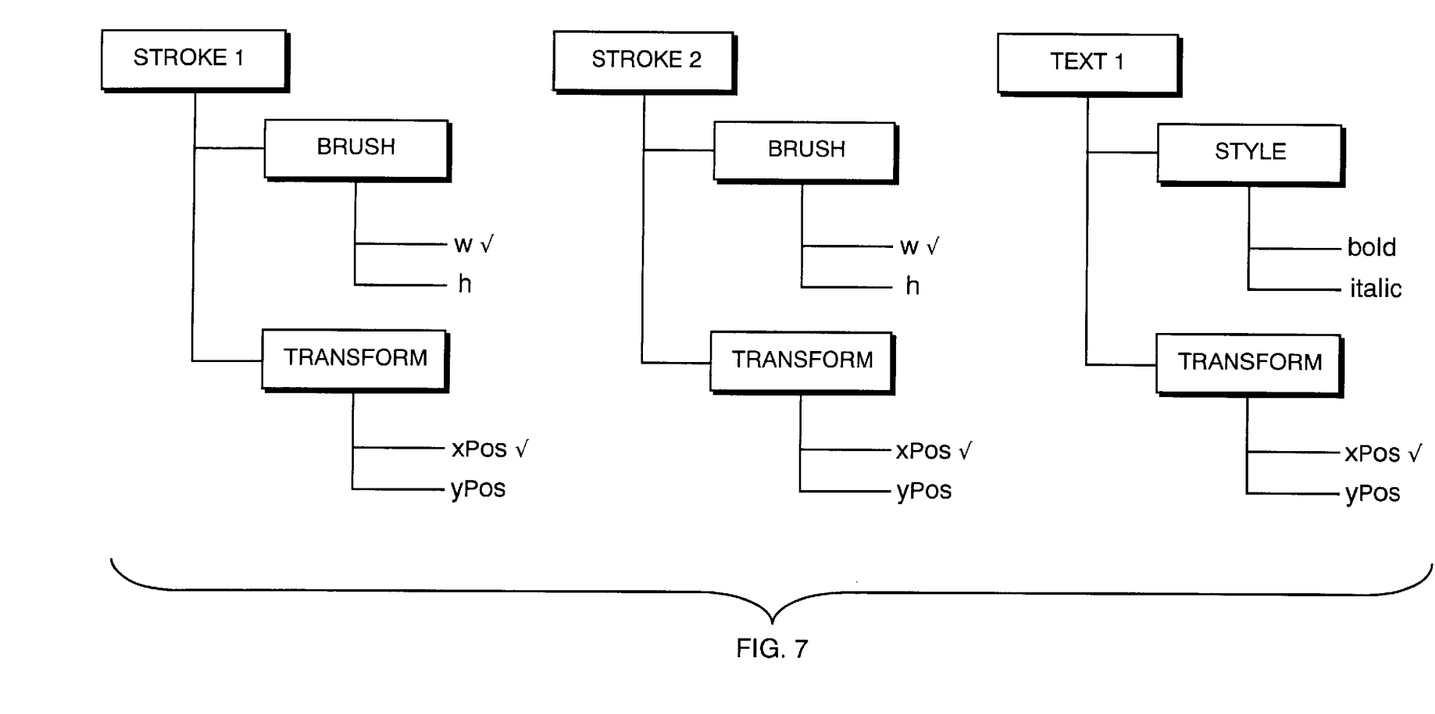
FIG. 7 depicts an example of an individual selection of marking parameters.

Marking is similar to selection, in that marking one control unmarks all other anywhere in the interface. Referring to FIG. 4 where is shown three PSets Stroke1, Stroke 2, and Text 1., the user selects Stroke 1 and opens the brush property editor. The 'width' parameter is marked. Note that stroke 2 has a brush PSet, and that it also gets marked as shown in FIG. 5. This is explained in more detail in later discussions. As shown in FIG. 6, the user then opens the transform property page and marks the 'xPos' parameter. The 'w' parameter is unmarked. Because the text body also contains an identical Transform Pset in the same position relative to the root object, the 'xPos' is also marked in the text body. The user can toggle marking for individual controls without affecting the state of all others by control-clicking on the label for a control which toggles only the marking for the current parameter and not all others. As depicted in FIG. 7, the user ctrl-clicks on 'height' in the brush editor. There are now two marked parameters.

Marking is shared at the PSet level. When the user changes selection from one object to another, the PSets that are shared in a common position by the hierarchies of both objects will not have their marking states changed. For example, if the user selects stroke 1 and marks the brush width, and then selects stroke 2. Because both strokes contain the brush PSet at the same position in their hierarchies, the brush width parameter will remain marked. The user will perceive that objects of the same class with a fixed PSet structure will all have the same marking, because they all share the same structure of PSets. If the user is working on some attribute of one object and then selects another 'compatible' object he will likely want to continue doing the same sort of work on that other object. If marking state were not preserved the user would have to open the editor back up and re-mark what he was working on.

Figure 9:
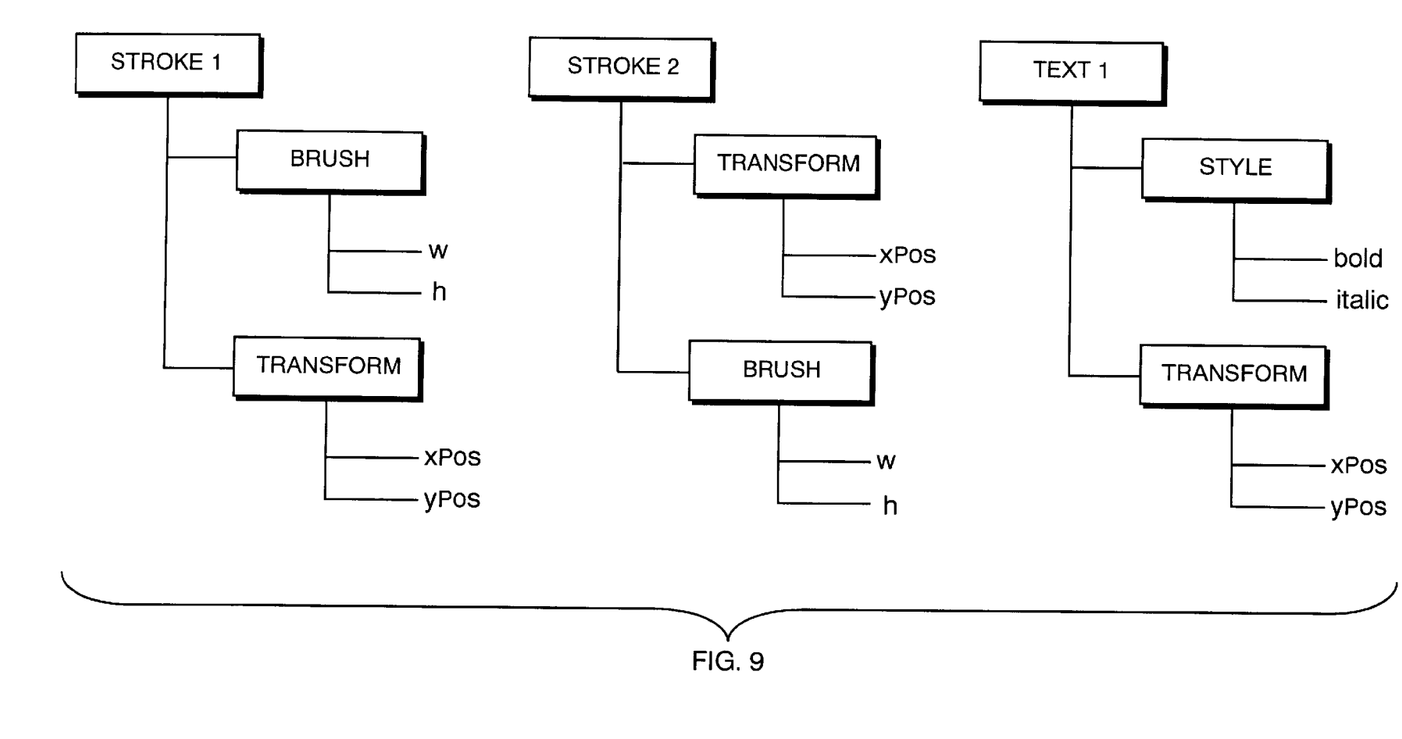
FIG. 9 depicts two PSets having a brush PSet in different hierarchical levels.

Some objects contain the same PSets in different positions or hierarachy level from other objects. For example, in FIG. 9 the brush PSet is in a different hierarchy level in stroke versus stroke 2. Marking will not be preserved unless a PSet appears in the same position in the PSet hierarchies of both the old and newly selected object. Some objects contain dynamic lists of PSets, meaning that marking a parameter in object instance 1 will not necessarily be reflected in object instance 2 either because the second object does not contain the marked parameter from object 1 or because the objects are incompatible (eg. select a light, select a video clip)

Figure 8A:
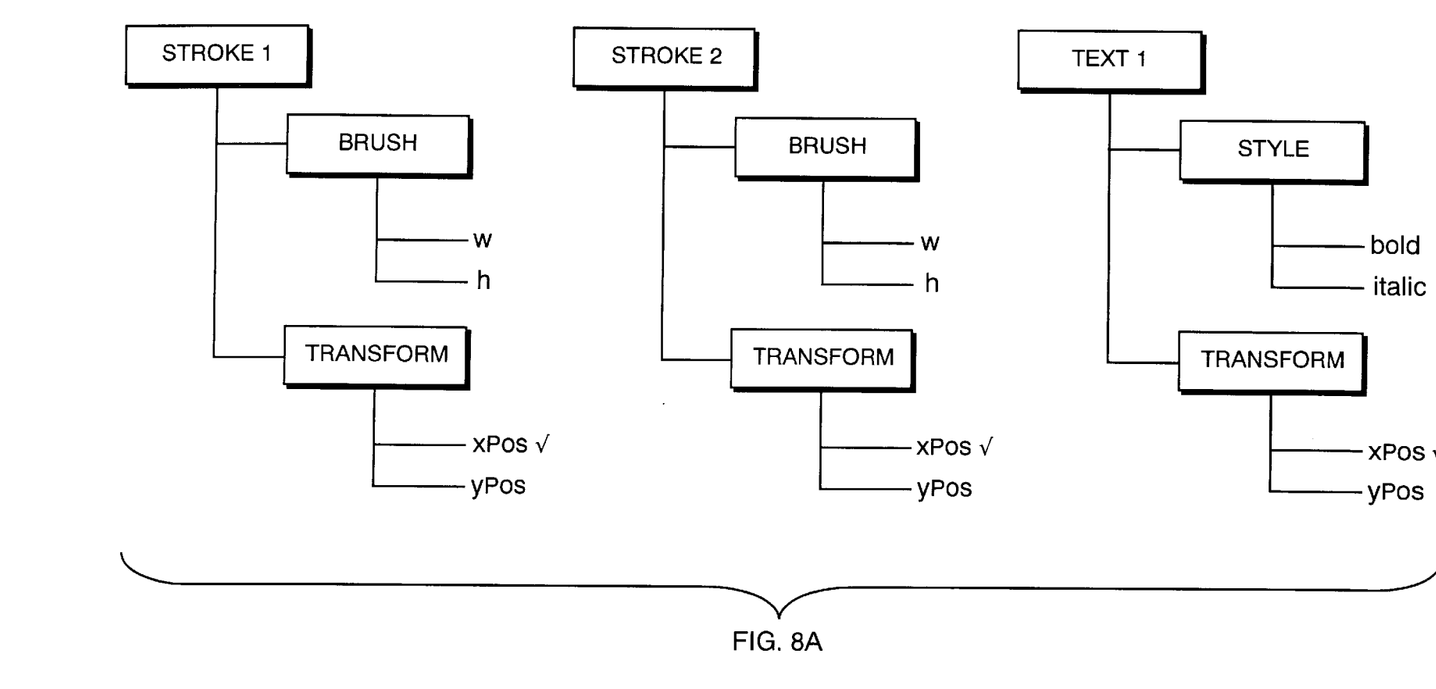
FIGS. 8A through 8D depict a marking sequence, according to the invention.
Figure 8B:
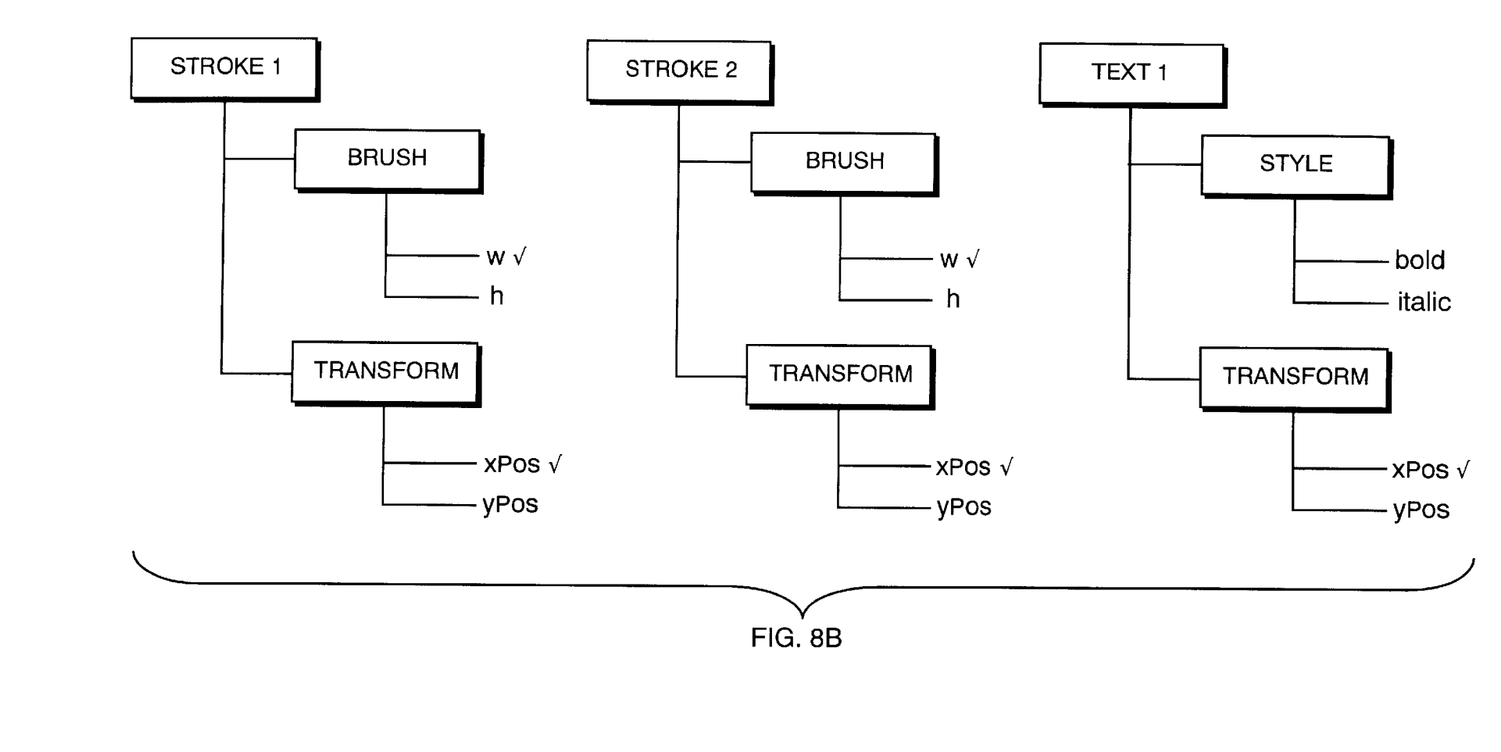
Figure 8C:
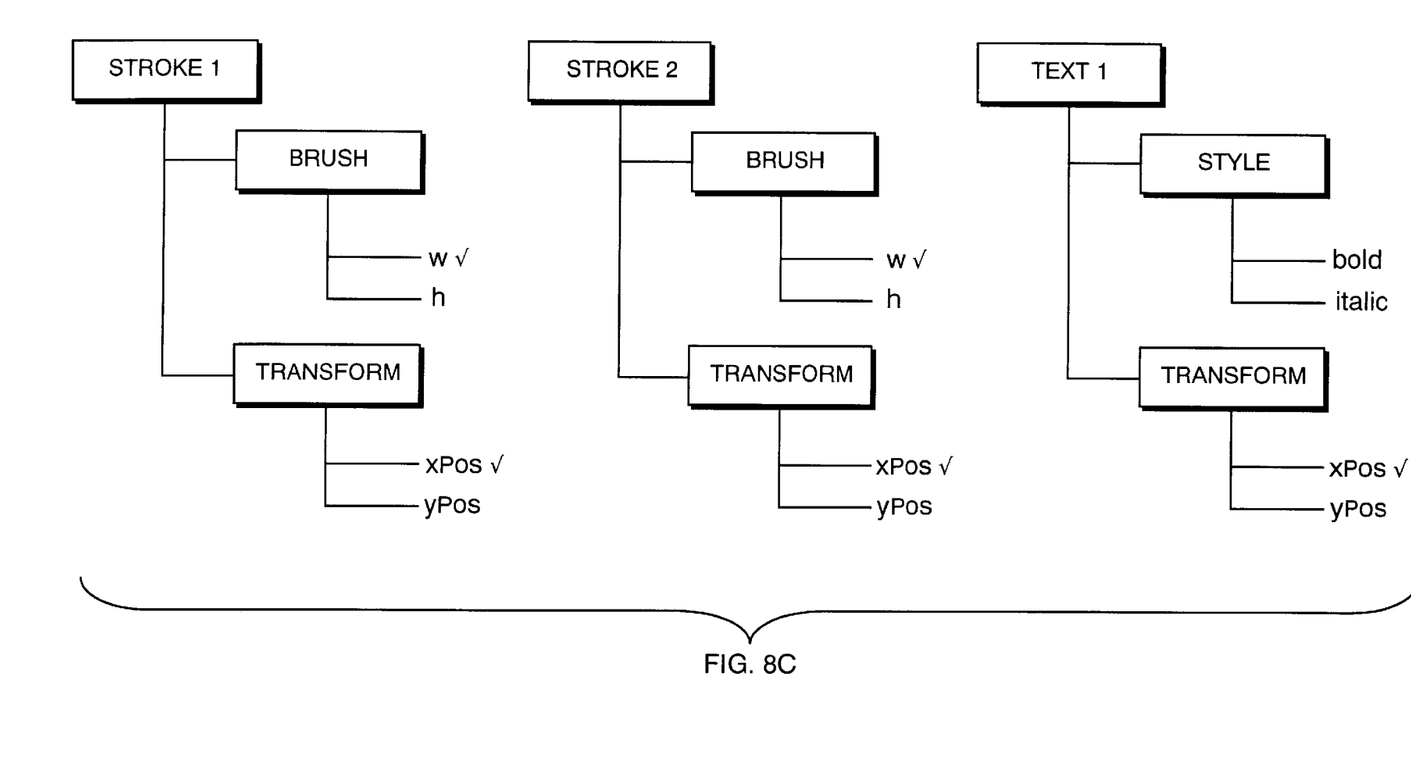

On a selection change, PSets which are shared between the old and new selection in a common hierarchy position, will retain their existing marks. All parameters in other PSets will be unmarked. Referring to FIGS. 8A, 8B, 8C, and 8D, the user has two strokes and a text body. Referring to FIG. 8A, the user selects stroke 1 and marks 'xPos'. If he were to select the text body or stroke 2, he would see 'xPos' marked, because all objects share the Transform PSet. After marking 'brush width', as shown in FIG. 8C, Stroke 2 shares the brush preset, but text 1 does not: The text body is selected. "Referring to FIG. 8C, the user selects stroke 1 and marks 'brush width'. If he were to select stroke 2, which shares the brush pset, he would see the 'brush width' parameter as marked; however, if he were to select text 1, which does not contain the brush Pset, he would of course not see a marked 'brush width' parameter" The 'xPos' parameter remains marked, as described above. Because the text body does not include the 'brush' PSet, brush width becomes unmarked as shown in FIG. 8C. He reselects the stroke 1.

Figure 8D:
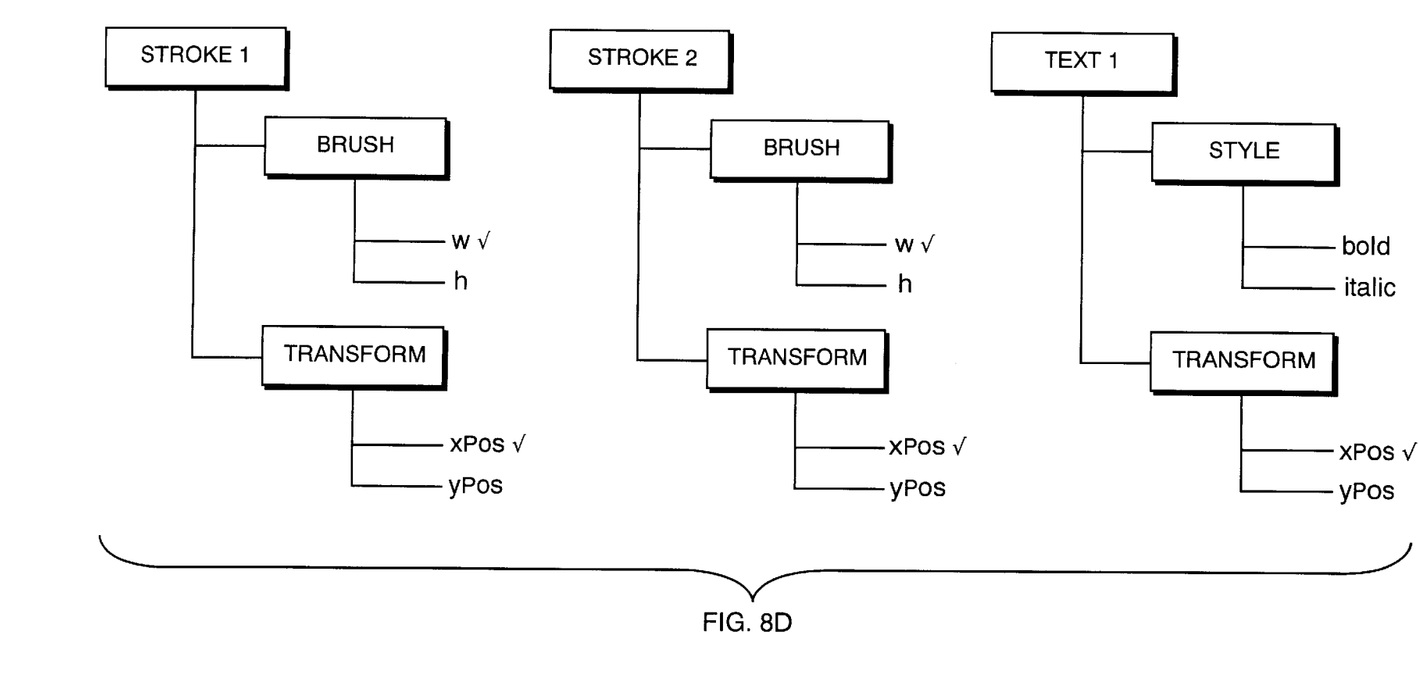

As reflected in FIG. 8D, there are no further changes in marking.

If the user deselects everything and then selects another object, the marking state from the previous selection is maintained at the PSet level. That is, deselecting everything is not regarded as a selection change.The user can attempt to mark parameters in locked editors as defined in the above referenced Patent application included by reference herein. This operation will succeed only if the PSet being reflected appears in the current selection at the same position in the hierarchy. For example, if the user tries to mark a parameter in a PSet that the selection does support, then the request will be successful and that parameter will appear as marked in all other places in the interface for example the scene explorer and the animation editor.

Marking is not persisted to disk. If the user loads a Preset, marking will not change, except as per a normal selection change, if necessary). If the user quits and restarts, none of the parameters he marked before quitting will be marked when he restarts.

Having described the invention, it should be apparent to those of ordinary skill in the art that the foregoing is illustrative and not limiting. Numerous modifications and other embodiments are within the scope of one of ordinary skill in the art and are contemplated as falling within the scope of the invention as defined by the appended claims.

We claim:

1. A method, operable on a computer system, for determining parameters to drive an animation application, the method comprising:

receiving a parameter set having a plurality of parameters corresponding to the animation application, wherein each parameter has keys;

assigning one or more of the parameters a value;

marking a subset of the parameters;

modifying the keys of only marked parameters; and running the animation application in response to the keys after marking.

2. The method of claim 1, wherein assigning comprises receiving user input indicative of a selection of a parameter and a value to be assigned to the selected parameter.

3. The method of claim 2, wherein marking comprises receiving user input indicative of a selected parameter.

4. The method of claim 3, wherein modifying includes receiving a user instruction to set the keys of marked parameters to the values assigned to the marked parameters.

5. The method of claim 1, wherein marking comprises receiving user input indicative of a selected parameter.

6. The method of claim 5, wherein modifying includes receiving a user instruction to set the keys of marked parameters to the values assigned to the marked parameters.

7. The method of claim 1, wherein modifying includes receiving a user instruction to set the keys of marked parameters to the values assigned to the marked parameters.

8. A computer readable medium having computer instructions stored thereon for implementing a method of determining parameters values to drive an animation application, the method comprising:

receiving a parameter set having a plurality of parameters corresponding to the animation application, wherein each parameter has keys;

assigning one or more of the parameters a value;

marking a subset of the parameters;

modifying the keys of only marked parameters; and running the animation application in response to the keys after marking.

9. The computer readable medium of claim 8, wherein assigning comprises receiving user input indicative of a selection of a parameter and a value to be assigned to the selected parameter.

10. The computer readable medium of claim 9, wherein marking comprises receiving user input indicative of a selected parameter.

11. The computer readable medium of claim 10, wherein modifying includes receiving a user instruction to set the keys of marked parameters to the values assigned to the marked parameters.

12. The computer readable medium of claim 8, wherein marking comprises receiving user input indicative of a selected parameter.

13. The computer readable medium of claim 12, wherein modifying includes receiving a user instruction to set the keys of marked parameters to the values assigned to the marked parameters.

14. The computer readable medium of claim 8, wherein modifying includes receiving a user instruction to set the keys of marked parameters to the values assigned to the marked parameters.

15. A method for specifying parameters of a function in an animation being created in an animation application, comprising:

receiving a parameter set including a plurality of parameters associated with the function, wherein each parameter is defined by one or more keys, wherein each key associates a value for the parameter with a point in time;

assigning one or more values to one or more of the plurality of parameters in the parameter set;

marking one or more of the parameters in the parameter set; and in response to a user instruction to set keys of parameters to the assigned values for the parameters at a current point in time in the animation, modifying the keys of only the marked parameters to be the values assigned to the marked parameters at the current point in time in the animation.

16. The method of claim 15, wherein assigning comprises receiving user input indicative of a selection of a parameter and a value to be assigned to the selected parameter.

17. The method of claim 16, wherein marking comprises receiving user input indicative of a selected parameter.

18. The method of claim 15, wherein marking comprises receiving user input indicative of a selected parameter.

* * * * *